(12) United States Patent
Grandhe (10) Patent No.: US 9,723,142 B2
(45) Date of Patent: Aug. 1, 2017

(54) CALL PRIORITY FOR MOBILE DEVICES

(71) Applicant: QUALCOMM Incorporated, San Diego, CA (US)

(72) Inventor: Sivakumar Grandhe, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/596,205

(22) Filed: Jan. 13, 2015

(65) Prior Publication Data

US 2016/0057283 A1 Feb. 25, 2016

Related U.S. Application Data

(60) Provisional application No. 62/039,373, filed on Aug. 19, 2014.

(51) Int. Cl.
| | |
|---|---|
| *H04M 3/436* | (2006.01) |
| *H04W 4/16* | (2009.01) |
| *H04W 4/12* | (2009.01) |
| *H04W 52/02* | (2009.01) |
| *H04M 1/57* | (2006.01) |
| *H04M 1/725* | (2006.01) |
| *H04W 88/02* | (2009.01) |
| *H04M 1/663* | (2006.01) |

(52) U.S. Cl.
CPC .......... *H04M 3/4365* (2013.01); *H04M 1/57* (2013.01); *H04M 1/72519* (2013.01); *H04M 1/72583* (2013.01); *H04W 4/12* (2013.01); *H04W 4/16* (2013.01); *H04W 52/0264* (2013.01); *H04M 1/663* (2013.01); *H04W 88/02* (2013.01); *Y02B 60/50* (2013.01)

(58) Field of Classification Search
CPC .......... H04M 3/4365; H04M 1/72597; H04M 2207/20; H04M 3/42374; H04W 4/12; H04W 4/16; H04W 12/06; H04W 28/14; H04W 52/0264; H04W 88/02; H04W 72/10; H04W 72/12; H04W 74/00; H04W 88/18; H04W 8/18
USPC ....................................... 455/415
See application file for complete search history.

(56) References Cited

U.S. PATENT DOCUMENTS

| | | | | |
|---|---|---|---|---|
| 8,369,502 | B2* | 2/2013 | Hayakawa | ........ H04L 29/06027 370/252 |
| 8,532,627 | B1* | 9/2013 | Nassimi | ............ H04M 3/42153 340/7.28 |
| 8,532,631 | B2 | 9/2013 | Krishnamurthy | |
| 8,886,252 | B2* | 11/2014 | Luke | .................. H04M 1/6041 455/550.1 |
| 2007/0072593 | A1 | 3/2007 | Huliyapur | |

(Continued)

*Primary Examiner* — Hirdepal Singh
(74) *Attorney, Agent, or Firm* — Arent Fox LLP (57) ABSTRACT

Systems and method are provided for using a priority level for a call from a caller to a callee. The systems and methods involve presenting to the caller on a screen of a caller's mobile device an option for selecting the priority level for the call at a time that the call is initiated by the caller. The systems and methods further involve transmitting data corresponding to the priority level from the caller's mobile device to a callee's mobile device. The systems and methods further involve providing an indication on the callee's mobile device of the priority level at a time that the call is indicated to the callee as incoming.

24 Claims, 6 Drawing Sheets

(56) References Cited

U.S. PATENT DOCUMENTS

| | | | |
|---|---|---|---|
| 2009/0088168 A1* | 4/2009 | Varanasi | H04M 1/663 |
| | | | 455/445 |
| 2009/0252303 A1 | 10/2009 | Agarwal | |
| 2010/0151839 A1* | 6/2010 | Krishnamurthy | H04M 3/42 |
| | | | 455/414.1 |
| 2011/0281561 A1 | 11/2011 | Erb | |
| 2013/0202097 A1* | 8/2013 | Schultz | H04M 11/08 |
| | | | 379/93.17 |
| 2013/0225190 A1* | 8/2013 | Aoyagi | H04M 3/436 |
| | | | 455/452.1 |
| 2014/0051379 A1* | 2/2014 | Ganesh | H04W 4/22 |
| | | | 455/404.1 |
| 2015/0117444 A1* | 4/2015 | Sandblad | H04L 65/1059 |
| | | | 370/352 |
| 2015/0245189 A1* | 8/2015 | Nalluri | G06Q 50/265 |
| | | | 455/404.1 |
| 2015/0312731 A1* | 10/2015 | Bendi | H04W 4/12 |
| | | | 455/414.1 |

* cited by examiner

CALL PRIORITY FOR MOBILE DEVICES

CROSS-REFERENCE TO RELATED APPLICATION(S)

This application claims the benefit of U.S. Provisional Application Ser. No. 62/039,373, entitled "CALL PRIORITY SETTING FOR MOBILE DEVICES" and filed on Aug. 19, 2014, which is expressly incorporated by reference herein in its entirety.

BACKGROUND

Field

The present disclosure relates generally to communication systems and processes and more particularly, to setting and indication of call priority levels for mobile devices and handling of calls with different priority levels.

Background

With standard smartphone functionality, a user (caller) may place a call to another user (callee). This standard functionality may involve the caller entering the callee's telephone number, selecting the callee's name from a list of contacts, or some other input function. This standard functionality may involve the callee's smartphone producing an indicator of the incoming call as an alert to the callee. This indicator may be an audible indicator (ringtone), a visual indicator ("Incoming Call from Bob" displayed on smartphone screen), a vibration indicator, or some other indicator.

With this standard smartphone functionality, the callee may find himself at times in a situation where he decides not to answer an incoming call. The callee may decide not to answer the incoming call after seeing the identity of the caller, such as by viewing the smartphone screen. The callee may decide not to answer the incoming call without seeing the identity of the caller, such as when the smartphone is in his pocket and he does not want to remove it. As an example, the receiver may be in a business meeting. While in the business meeting, the callee receives an incoming call from the caller. The callee decides not to answer the incoming call given that he is in the business meeting. As a further example, the callee may be concentrating on an activity, such as reading a book. While reading, the callee receives an incoming call from the caller. The callee decides not to answer the incoming call, and potentially does not even look to see who the caller is, given that he is concentrating on reading.

SUMMARY

Embodiments relate to systems and methods for setting, validating, and indicating call priority levels, and further handling calls based on priority level.

Embodiments build on functionality of existing mobile devices. While the embodiments described herein will generally refer to cellular network-based voice calls to and from smartphones, other embodiments are foreseen. In some embodiments, other mobile devices such as tablets and laptops capable of sending and receiving calls may be used. In some embodiments, other types of calls, such as combined audio-video calls and VOIP calls may be used.

According to an embodiment, a method is provided for using a priority level for a call from a caller to a callee. The method includes receiving, at a callee's mobile device from a caller's mobile device, data corresponding to the priority level. The data corresponding to the priority level may represent the priority level set by the caller at the time that the call was initiated by the caller. The method further includes providing an indication on the callee's mobile device of the priority level at a time that the call is indicated to the callee as incoming.

In some embodiments, the method further includes various ways of indicating the call priority level to the callee. For example, indicating the call priority level may include presenting a particular color on a screen of the callee's mobile device that corresponds to the priority level. As another example, indicating the call priority level may include presenting a particular text on the screen of the callee's mobile device that corresponds to the priority level. As another example, indicating the call priority level may include emitting a particular sound from the callee's mobile device that corresponds to the priority level. As another example, indicating the call priority level may include emitting a particular vibration pattern from the callee's mobile device that corresponds to the priority level.

In some embodiments, the method further includes changing the callee's mobile device from a silent mode to a non-silent mode as a way of providing an indication of the priority level.

In some embodiments, the method further includes automatically answering the call as a way of indicating the call priority level to the callee.

In some embodiments, the method further includes validating whether the caller is permitted to make the call to the callee using the priority level.

In some embodiments, the method further includes comparing, using the callee's mobile device, a phone number associated with the call to telephone numbers corresponding to contacts stored in the callee's mobile device as a way of validating whether the caller is permitted to make the call to the callee using the priority level.

In some embodiments, the method further includes comparing, using the callee's mobile device, a number associated with the call to telephone numbers corresponding to contacts indicated as favorites in the callee's mobile device as a way of validating whether the caller is permitted to make the call to the callee using the priority level.

In some embodiments, the method further includes performing on the callee's mobile device one or more special behaviors corresponding to the priority level when the callee answers the call.

In some embodiments, the method further disabling indicators from applications executing on the callee's mobile device for the duration of the call as a form of one or more special behaviors corresponding to the priority level.

In some embodiments, the method further includes preventing a call waiting indicator for another incoming call at the callee's mobile device, wherein a priority level associated with the other incoming call is lower than the priority level for the call.

In some embodiments, the method further includes terminating one or more applications executing on the callee's mobile device in order to reduce battery consumption as a form of one or more special behaviors corresponding to the priority level.

According to an embodiment, a mobile device is provided for using a priority level for a call from a user of a second mobile device to the mobile device. The mobile device is configured to receive, from the user of the second mobile device, data corresponding to the priority level. The data corresponding to the priority level may represent the priority level set by the user of the second mobile device at the time that the call was initiated by the user of the second mobile device. The mobile device may be further configured to provide an indication of the priority level at a time that the call is indicated on the mobile device as incoming.

In some embodiments, the mobile device may indicate the call priority level in various ways. For example, indicating the call priority level may include presenting a particular color on a screen of the mobile device that corresponds to the priority level. As another example, indicating the call priority level may include presenting a particular text on the screen of the mobile device that corresponds to the priority level. As another example, indicating the call priority level may include emitting a particular sound from the mobile device that corresponds to the priority level. As another example, indicating the call priority level may include emitting a particular vibration pattern from the mobile device that corresponds to the priority level.

In some embodiments, the mobile device may be configured to change the mobile device from a silent mode to a non-silent mode as a way of providing an indication of the priority level.

In some embodiments, the mobile device may be configured to automatically answer the call as a way of indicating the call priority level on the mobile device.

In some embodiments, the mobile device may be configured to validate whether the user of the second mobile device is permitted to make the call to the mobile device using the priority level.

In some embodiments, the mobile device may be configured to compare a phone number associated with the call to telephone numbers corresponding to contacts stored in the mobile device as a way of validating whether the user of the second mobile device is permitted to make the call to the mobile device using the priority level.

In some embodiments, the mobile device may be configured to compare a number associated with the call to telephone numbers corresponding to contacts indicated as favorites in the mobile device as a way of validating whether the user of the second mobile device is permitted to make the call to the mobile device using the priority level.

In some embodiments, the mobile device may be configured to perform one or more special behaviors corresponding to the priority level when the mobile device answers the call.

In some embodiments, the mobile device may be configured to disable indicators from applications executing on the mobile device for the duration of the call.

In some embodiments, the mobile device may be configured to prevent a call waiting indicator for another incoming call at the mobile device, wherein a priority level associated with the other incoming call is lower than the priority level for the call.

In some embodiments, the mobile device may be configured to terminate one or more applications executing on the mobile device in order to reduce battery consumption.

According to an embodiment, computer program product including one or more non-transitory computer readable media having codes for causing one or more computers to execute is provided for using a priority level for a call from a caller to a callee. The one or more computers are caused to receive, at a callee's mobile device from a caller's mobile device, data corresponding to the priority level. The data corresponding to the priority level may represent the priority level set by the caller at the time that the call was initiated by the caller. The one or more computers are further caused to provide an indication on the callee's mobile device of the priority level at a time that the call is indicated to the callee as incoming.

DETAILED DESCRIPTION

Embodiments relate to systems and methods for setting, validating, and indicating call priority levels, and further handling calls based on priority level.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with "processing electronics" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk, where disks usually reproduce data magnetically, while discs reproduce data optically with lasers. Combinations of the above should also be included within the scope of computer-readable media.

First, an example communication system according to conventional systems will be discussed. A person initiating a call on an electronic communication network is referred to as a caller in this disclosure. A person receiving a call request from a caller is referred to as a callee in this disclosure. A caller initiates a call to a callee. The caller may use a caller mobile device, and the callee may use a callee mobile device. The call initiated by the caller and received as an incoming call by callee is placed through a cellular network or other electronic communication network, to which both the caller mobile device and the callee mobile device are connected. In other scenarios, the call may use different intermediate networks, such as multiple cellular networks or a cellular network and a local area network. The caller mobile device has a screen that indicates to the caller that the call has been initiated. The callee mobile device has a screen that indicates to the callee that an incoming call has been received from the caller. In some embodiments, the call may be a telephone call.

In such a conventional system, the callee receiving the incoming call from the caller may receive an indication that an incoming call has been received and who is calling. However, the caller cannot indicate how important the call is. As such, the callee is not informed of how important the call is. While some techniques may be possible with the conventional system to allow the caller to inform the callee of the importance of the call, none of these options are ideal. The caller could send a text message or email to the callee explaining that he will be placing a very important call to the callee momentarily. However, the text message or email may not arrive prior to the incoming call being received by the callee, because real-time delivery of text messages and emails is not guaranteed. Furthermore, even if the text message or email is received by the callee mobile device prior to receiving the incoming call, the callee may not have checked his text messages or emails recently, thereby missing the indication that the incoming call is important. Furthermore, the extra steps involved in sending a text message or email are inconvenient and time consuming for the caller, especially if an urgent situation has occurred that demands an immediate, very important phone call to the callee. Therefore, a new technique that provides a convenient and effective setting and indication of priority levels on calls is needed.

Figure 1:
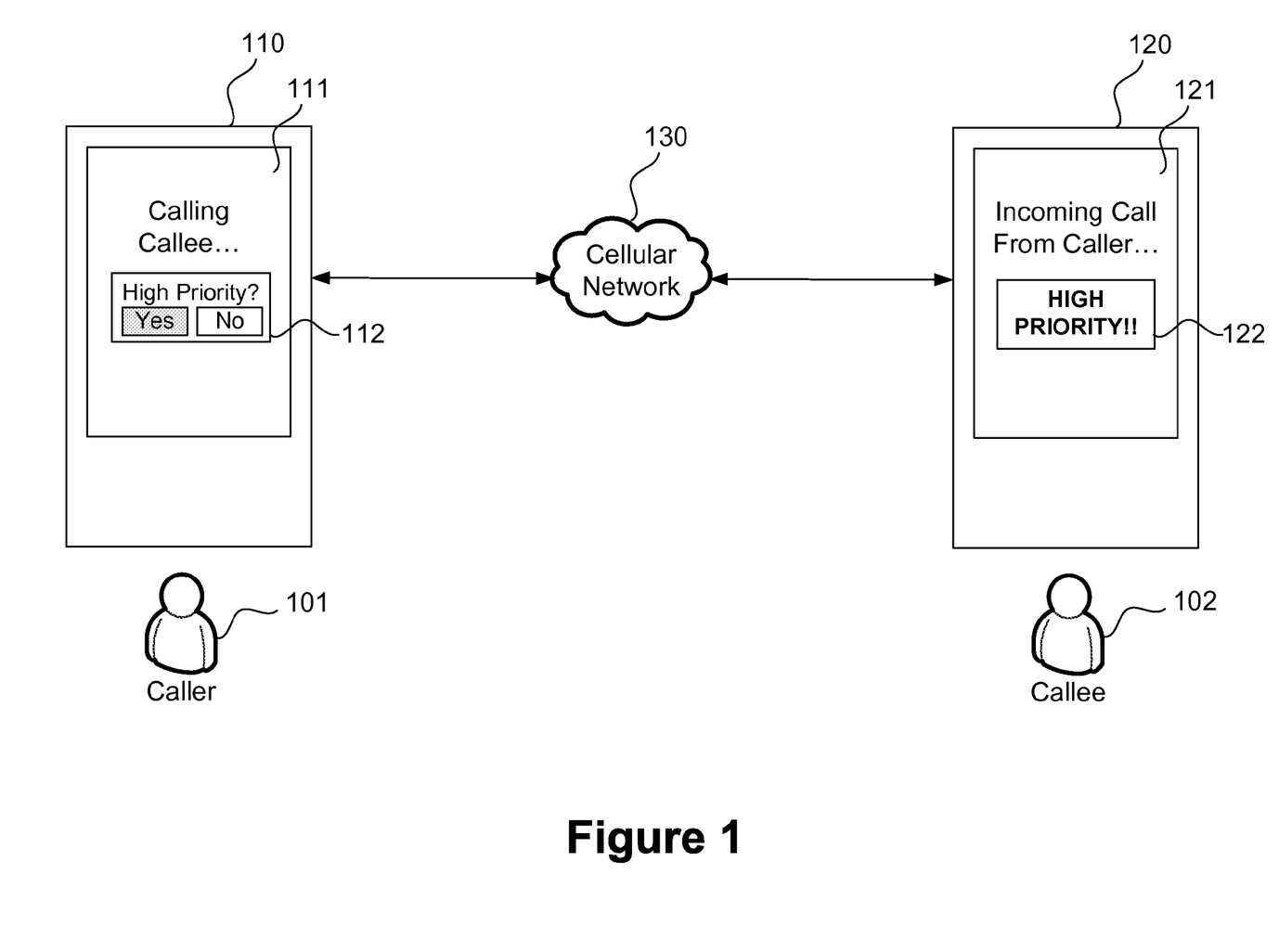
FIG. 1 is a diagram of a communication system according to various embodiments.

FIG. 1 is a diagram of a communication system according to various embodiments of the disclosure. FIG. 1 shows: a caller 101 with a mobile device 110 having a screen 111; a cellular network 130; and a callee 102 with a mobile device 120 having a screen 121. The mobile devices 110 and 120 may be any of a variety of devices capable of initiating and receiving calls, such as mobile telephone devices, cellular telephones, smartphones, tablet computers, laptop computers, etc. As shown in FIG. 1, the screen 111 indicates to the caller 101 that a call has been initiated with callee 102. Screen 111 additionally provides a priority selection area 112 that the caller 101 can use to set a priority level for the call. The screen 121 indicates to the callee 102 that an incoming call has been received from the caller 101. Screen 121 additionally provides a priority indication area 122 that indicates to the callee 102 the priority level selected by the caller 101 for the incoming call. In the example of FIG. 1, the caller 101 has selected "Yes" for a high priority level using priority selection area 112, and a corresponding message for the high priority level is displayed to the callee 102 in priority indication area 122. The call initiated by the caller 101 and received as an incoming call by callee 102 is placed through a cellular network 130, to which both the mobile device 110 and the mobile device 120 are connected. In other scenarios, the call may use different intermediate networks, such as multiple cellular networks or a cellular network and a local area network.

The use of priority selection area 112 and priority indication area 122 are an improvement over conventional systems. The use of priority selection area 112 allows the caller 101 to set the priority level for the call using the same interface with which the call is initiated. Likewise, priority indication area 122 indicates to the callee 102 the priority level of the call using the same interface with which the details of the incoming call are displayed. In this way, both the caller 101 and callee 102 have convenient access to the priority level for the call. In addition, because the priority level is displayed at the same time that the incoming call details are displayed, the callee 102 will be sure to receive the priority level indication prior to or at the same time as receiving the incoming call. Finally, data corresponding to the priority level selected in priority selection area 112 can be sent through the cellular network to the mobile device 120 using a real-time transmission channel. In this way, the callee 102 will always receive an indication of the selected priority level in priority indication area 122 along with the displaying of the incoming call details. With these improvements, various embodiments of the disclosure allow convenient and effective setting and indication of call priority levels, allowing receivers of calls to make more informed decisions as to answering or ignoring incoming calls.

In various embodiments of the present disclosure, a variety of real-time transmission channels may be used to transmit data corresponding to the priority level selected in priority selection area 112 through the cellular network to the mobile device 120. User-User message communication functionality, such as that described in 3GPP Spec 24.008, may be used in some embodiments. Existing bits or added bits in a call setup message used to initiate the call may be used in some embodiments. Other messaging techniques consistent with this disclosure are possible in various embodiments.

In various embodiments of the present disclosure, a variety of techniques may be used to allow the caller to select a priority level, notwithstanding how priority selection area 112 is shown in FIG. 1. As an example, priority selection area 112 may be displayed in the same window displayed on screen 111 as is displayed a number pad for dialing a telephone number. In this way, caller 101 can choose the priority level using the same interface as is used to type in a telephone number to call. As another example, priority selection area 112 may be displayed as a popup window or new window immediately after the caller 101 takes some action that initiates a call. For instance, if the caller 101 taps the name of a contact on the screen 111, which would typically be effective to initiate a call to that contact, a popup window or new window with priority selection area 112 may be displayed to allow the caller 101 to select a priority level. Other priority level selection techniques consistent with this disclosure are possible in various embodiments.

In various embodiments of the present disclosure, a variety of techniques may be used to indicate the priority level of an incoming call, notwithstanding how priority indication area 122 is shown in FIG. 1. As an example, some text characters may be displayed on screen 121 that correspond to the selected priority level for the incoming call, such as "HIGH PRIORITY!!" as shown in FIG. 1. As another example, some special coloring may be displayed on screen 121 or elsewhere on the mobile device 120 that corresponds to the selected priority level. For instance, a solid red background color behind the "Incoming Call From Caller . . . " text may be used when an incoming call is of high priority. As another example, some special audible tone may be emitted from mobile device 120 to indicate the selected priority level. For instance, an obnoxious blaring buzzer sound may be used in place of a default ringtone when an incoming call is of high priority. As another example, some special vibration pattern may be used to indicate the selected priority level. For instance, a constant (as opposed to intermittent) vibration of the mobile device 120 may be used when an incoming call is of high priority. As another example, mobile device 120 may switch from a silent mode to a non-silent mode based on the selected priority level of the incoming call. For instance, if mobile device 120 is set to only vibrate and present a visual indicator for an incoming call (but no audible indicator), mobile device 120 may instead use all of a vibration indicator, a visual indicator, and an audible indicator if the incoming call is of high priority. As another example, mobile device 120 may automatically answer an incoming call based on the priority level. For instance, for an incoming call of high priority, mobile device 120 may indicate the high priority level to callee 102 but also automatically answer the incoming call. The callee may have the ability to enable and disable this automatic answering functionality through a configuration tool on mobile device 120. Other priority level indication techniques consistent with this disclosure are possible in various embodiments.

As alluded to by the examples above, mobile devices 110 and 120 may be configured to have various default behaviors that correspond to a default priority level. As an example, if the caller 101 does not select a priority level or selects a default priority level using priority selection area 112, data indicating a default priority level may be sent through the cellular network 130 to the mobile device 120. Priority indication area 122 may then display default information corresponding to the default priority level. In addition, if a default priority level is selected, it may be preferable to send no data indicating priority level through the cellular network 130 to mobile device 120. Additionally, priority indication area 122 may be entirely omitted for the default priority level or no indicated priority level. Other priority indication techniques, such as those described above, may perform default behavior when the default priority level or no priority level is indicated for an incoming call. In this way, the indication of a priority level to the callee 102 may be a special mode for mobile device 120 that is only exercised when a non-default priority is selected by the caller 101.

Other techniques for default and non-default priority levels consistent with this disclosure are possible in various embodiments.

While the present disclosure has heretofore discussed priority levels as "high priority" and "default priority," various embodiments of the present disclosure may use different types of priority levels. As an example, a set of priority levels linearly relating to higher and lower priority levels may be used. When only two such priority levels are used, this may result in "default" and "high" priority levels. When more than two such priority levels are used, this may result in "low," "medium," and "high" priority levels. When more than three such priority levels are used, this may result in "low," "default," "high," "ultra super urgent," and "come on, seriously, I need you to pick the phone up" priority levels. In these cases, it is possible to have a different priority level indication behavior for each priority level. Other priority level schemes consistent with this disclosure are possible in various embodiments.

In various embodiments of the present disclosure, mobile device 110 and/or mobile device 120 may provide an interface to allow caller 101 and/or callee 102 to customize the behavior of the mobile device for high priority calls. This may include setting the behavior of mobile device 120 as to how it indicates that an incoming call is high priority. This may include setting the behavior of mobile device 110 as to the default priority level for calls placed from that device. This may include setting the behavior of how the priority level on an incoming call is validated and how the mobile device performs during a high priority call, each described in more detail below.

Figure 2:
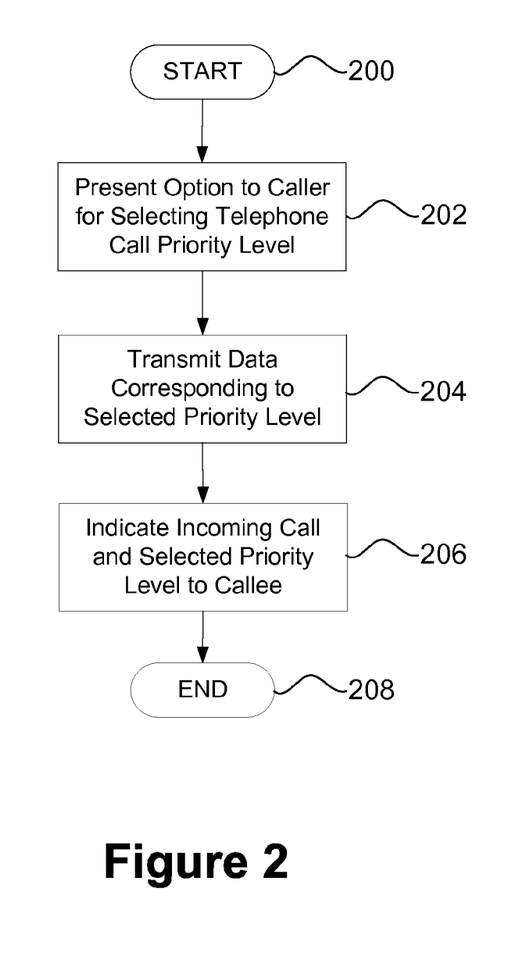
FIG. 2 is a flow chart of a process for setting and indicating call priority levels according to various embodiments.

FIG. 2 is a flow chart of a process for setting and indicating call priority levels according to various embodiments of the disclosure. The process starts at block 200.

At block 202, the caller is presented the option for selecting a priority level for the call. As an example, the caller may be presented with a popup window or a new window containing a priority selection area as previously described in this disclosure. Other techniques for allowing selection of a priority level, such as those previously described in this disclosure, may be used.

At block 204, data corresponding to the priority level selected by the caller is transmitted from the caller's mobile device, through the cellular network, and to the callee's mobile device. This data is preferably transmitted as part of or concurrently with the messaging used to initiate the call, such as call setup messaging.

At block 206, the callee's mobile device indicates to the callee that an incoming call has been received and that it is of the selected priority level. As an example, the callee's mobile device may display "Caller calling . . . HIGH PRIORITY!!" on a screen of the mobile device. Any of the techniques described previously in this disclosure for indicating the priority level of an incoming call may be used.

The process ends at block 208.

Figure 3:
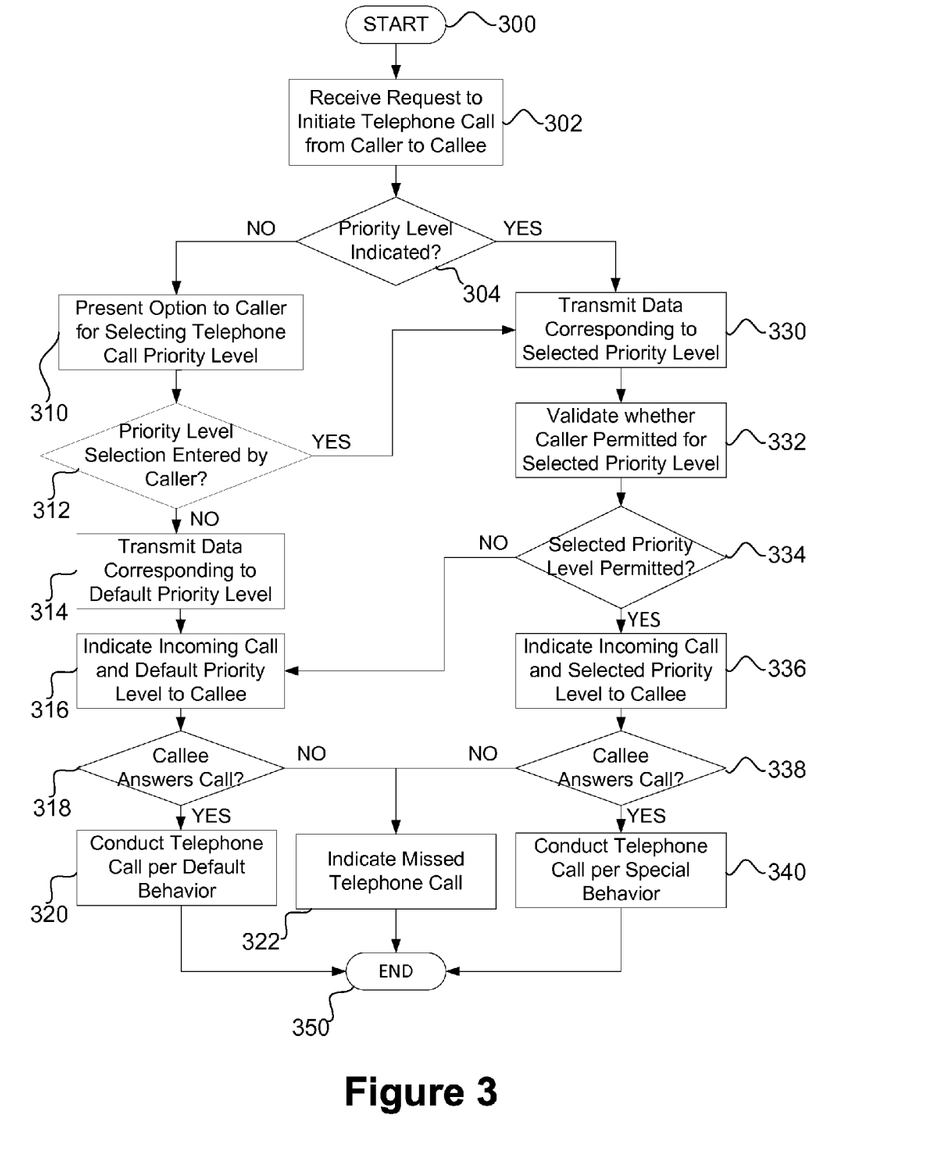
FIG. 3 is a flow chart of a process for setting and indicating call priority levels according to various embodiments.

FIG. 3 is a flow chart of a process for setting and indicating call priority levels according to various embodiments of the disclosure. The process starts at block 300 and ends at block 350.

At block 302, a request to initiate a call from a caller to a callee is received. This may involve the caller's mobile device receiving an indication from the GUI as to a callee with whom the caller has indicated a call should be initiated. The caller may have made this indication by typing in a telephone number and pressing "Call," by tapping on a phone number in the mobile device's call history interface, by tapping on the name of a contact in a contacts application, by tapping on a contact in the mobile device's favorites interface, or by some other technique.

At block 304, a determination is made as to whether a priority level for the call was indicated in the request received at block 302. As an example, in a case where a priority selection area is displayed along with the number pad on the mobile device's interface, the initial request to initiate a call may include a priority level selection from the caller. However, where the caller ignored such a priority selection area or where such a priority selection area was not yet presented to the caller, the request received at block 302 may not include a previously selected priority level. In the case where a priority level was not indicated in the request, then the process continues at block 310. In the case where a priority level was indicated in the request, then the process continues at block 330.

At block 310, the caller is presented the option for selecting a priority level for the call. As an example, the caller may be presented with a popup window or a new window containing a priority selection area as previously described in this disclosure. Other techniques for allowing selection of a priority level, such as those previously described in this disclosure, may be used.

At block 312, a determination is made as to whether a priority level selection was entered by the caller. While the caller was presented with an option for selecting a priority level for the call at block 310, the caller may or may not select a priority level. As an example, the caller's mobile device may wait a predefined period of time, such as three seconds, after presenting the option for selecting a priority level in block 310 before proceeding without such a selection. In the case where a priority level was selected and received, the process continues at block 330. In the case where a priority level was not selected and received, the process continues at block 314.

At block 314, data corresponding to a default priority level is transmitted from the caller's mobile device, through the cellular network, and to the callee's mobile device. This data is preferably transmitted as part of or concurrently with the messaging used to initiate the call, such as call setup messaging.

At block 316, the callee's mobile device indicates to the callee that an incoming call has been received and that it is of the default priority level. As an example, the callee's mobile device may display "Caller calling . . . (Ordinary Call)" on a screen of the mobile device. Any of the techniques described previously in this disclosure for indicating the priority level of an incoming call may be used.

At block 318, a determination is made as to whether the callee answers the call. If the callee answers the call, then at block 320 the callee's mobile device conducts the call per default behavior. If the callee does not answer the call, then at block 322 an indicator of the missed call may be presented on the callee's mobile device, such as a standard visual indicator on a screen of the callee's mobile device. After blocks 320 and 322, the process terminates at block 350.

At block 330, data corresponding to the selected priority level is transmitted from the caller's mobile device, through the cellular network, and to the callee's mobile device. This data is preferably transmitted as part of or concurrently with the messaging used to initiate the call, such as call setup messaging.

At block 332, the callee's mobile device validates whether the caller is permitted to initiate a call to the callee with the selected priority level. Given the special nature of some of the priority levels, the callee may wish to limit which people can initiate an incoming call to the callee with a high priority level. In addition, such permission and validation may prevent abuse of the priority levels by parties such as telemarketers or robocallers. Examples of how such validation can be performed are explained later in this disclosure.

At block 334, a determination is made as to whether the caller is permitted for the selected priority level based on the validation of block 332. In the case where the caller is not permitted to initiate a call with the selected priority level, the callee's mobile device proceeds with the call at block 316 at the default priority level. In the case where the caller is permitted to initiate a call with the selected priority level, the process proceeds at block 336.

At block 336, the callee's mobile device indicates to the callee that an incoming call has been received and that it is of the selected priority level. As an example, the callee's mobile device may display "Caller calling . . . HIGH PRIORITY!!" on a screen of the mobile device. Any of the techniques described previously in this disclosure for indicating the priority level of an incoming call may be used.

At block 338, a determination is made as to whether the callee answers the call. If the callee answers the call, then the process continues at block 340. If the callee does not answer the call, then at block 322 an indicator of the missed call may be presented on the callee's mobile device. The indicator of the missed call may be determined based on the selected priority level of the call that was missed. For example, for a high priority call that was missed, a special indicator of the missed call may be used, such as the callee's mobile device creating both an audible and visual alert every 20 seconds until the callee acknowledges the alert. After block 322, the process terminates at block 350.

At block 340, the callee's mobile device conducts the call per special behavior corresponding to the selected priority level. Because the callee's mobile device received data as to the importance of the call, the mobile device can perform various behaviors to improve the quality of the call or otherwise treat the call in a special way when so warranted by the selected priority level. Examples of such special behaviors are explained later in this disclosure. When the call is over, the process ends at block 350.

While FIG. 3 shows one embodiment of a process, variations of that process and other embodiments are consistent with the present disclosure. For example, the process shown in FIG. 3 may be modified to omit blocks 332 and 334. This may be preferred where there is sufficient trust in the users of the telephone system so that validation is not required. As another example, the process shown in FIG. 3 may be modified to replace block 340 with block 320. This may be preferred where a call priority functionality is desired during call initiation but no special behavior is desired during the duration of the call. As another example, the process shown in FIG. 3 may be modified to omit blocks 314 and 316. This may be preferred where a system-wide default priority level is known, so that additional overhead during transmission and call indication is avoided for default priority level calls. As another example, when the selected priority level for the call is determined to not be permitted at block 334, the process may terminate at block 350 instead of continuing with a default priority level. As another example, the caller may be able to disable and enable the presentation of an option for selecting the call priority level. If the caller disables call priority level setting, then blocks 310 and 312 may be skipped, and a default priority level may be used for all calls. Other modifications consistent with this disclosure are possible in various embodiments.

As briefly discussed above, the process shown in FIG. 3 includes a block of validating the caller and selected priority level in block 332.

In some embodiments, the validation of block 332 may be performed by the callee's mobile device. For example, when an incoming call is received by the callee's mobile device, the callee's mobile device may compare the phone number for the incoming call with an authorization list stored on the callee's phone. If the telephone number of the caller is in the authorization list, the selected priority level is permitted. Otherwise, it is not. The authorization list may be created and stored on the callee's mobile device in a variety of ways. The authorization list may be created and modified by the callee using an "authorize" vs. "not authorized" checkbox presented in a standalone software application or in a contacts/phone book software application that runs on the callee's mobile device. The authorization list could be created in other ways, such as downloaded from the cellular network. As another example, the callee's mobile device may compare the caller's telephone number to all of the telephone numbers stored for contacts in the mobile device. These contacts may correspond to entries in an address book/contacts or similar software application installed on the mobile device. If the caller's telephone number is stored as a contact for the callee, the selected priority level is permitted. Otherwise, it is not. As another example, the callee's mobile device may compare the caller's telephone number to all of the telephone numbers stored for "favorite" contacts in the mobile device. If the caller's telephone number is stored as a "favorite" contact for the callee, the selected priority level is permitted. Otherwise, it is not. Other validation techniques performed by the callee's mobile device consistent with this disclosure are possible in various embodiments.

In some embodiments, the validation of block 332 may be performed by the caller's mobile device. For example, the caller's mobile device may prevent the caller from being presented with an option to select a priority level for a call if the caller is not permitted for non-default priority levels for a particular callee. In this case, block 332 may be performed between block 304 and block 310 of the process shown in FIG. 3. The caller's mobile device may determine whether or not to present a priority selection option to the caller for a particular callee based on an authorization list, such as that described above. The caller's mobile device may maintain the authorization list by downloading it from the cellular network or based on authorization messages received through the cellular network. The downloading of the authorization list and receiving of authorization messages may be performed intermittently and/or separate from but prior to a time when the call is placed, so that this additional communication with the cellular network does not delay the placing of the call. Other validation techniques performed by the caller's mobile device consistent with this disclosure are possible in various embodiments.

In some embodiments, the validation of block 332 may be performed by a validation computing device associated with the cellular network. When a message for initiating a call is transmitted to the cellular network by the caller's mobile device, the cellular network may delay that call initiation message until the validation computing device can validate whether the caller is permitted to use the selected priority level for the intended callee. For example, the validation computing device may check whether the caller's telephone number is associated with a telemarketing service. If the caller's telephone number is associated with a telemarketing service, any non-default priority level is not permitted. As another example, the validation computing device may check whether the caller's telephone number is in an authorization list stored in for the callee. The validation computing device may retrieve the authorization list from the callee's mobile device at some periodic basis, generate the authorization list based on an authorization process, or generate the authorization list by some other technique. If the telephone number of the caller is in the authorization list, a non-default priority level is permitted. Otherwise, it is not. As another example, the validation computing device may check whether the caller and callee are on a shared voice and/or data plan with their cellular carrier. If the caller and callee share a cellular plan, a non-default priority level is permitted. Otherwise, it is not. As another example, the validation computing device may check whether the callee has selected the caller as a "FRIENDS & FAMILY," "FRAMILY," or other special rate phone number through the callee's cellular carrier. If the callee has so selected the caller, a non-default priority level is permitted. Otherwise, it is not. Other validation techniques performed by a validation computing device associated with the cellular network consistent with this disclosure are possible in various embodiments.

As briefly discussed above, the process shown in FIG. 3 includes a block of conducting the call per special behavior corresponding to the selected priority level in block 340.

The callee's mobile device may perform special behavior intended to avoid distracting the callee while the callee is taking part in a high priority call. For example, the callee's mobile device may disable indicators generated by applications executing on the mobile device while a high priority call is taking place. For instance, the callee's mobile device may prevent audible, visual, and/or vibration alerts as to received emails or text messages. Additionally, the callee's mobile device may prevent a call waiting indicator (often an audible beep and a visual display) from being presented while a high priority call is taking place. However, the callee's mobile device may opt to not prevent such a call waiting indicator where the newly incoming call has a selected priority level that is equal to or more important than that of the ongoing call. Other techniques for reducing distraction to the callee during high priority calls consistent with this disclosure are possible in various embodiments.

The callee's mobile device may perform special behavior intended to conserve the battery power of the mobile device during the duration of a high priority call. For example, the callee's mobile device may terminate software applications executing on the mobile device that are not necessary for the conduct of the high priority call. As another example, the callee's mobile device may power down any non-cellular radios, such as a Bluetooth radio, or other hardware that is not necessary for the conduct of the high priority call. In this way, the callee's mobile device can reduce battery consumption by non-essential software and hardware in order to lengthen the potential life of the mobile device for the high priority call. However, the callee's mobile device may avoid taking such actions to conserve battery charge until the remaining battery power is determined to be at a low level, such as 20% of charging capacity. Other techniques for reducing battery consumption during high priority calls consistent with this disclosure are possible in various embodiments.

The callee's mobile device may perform special behavior intended to improve the quality of the transmitted and received signals during the duration of a high priority call. For example, the callee's mobile device may increase the transmit power to the cellular base station in order to reduce data loss in a reverse link. However, the callee's mobile device may avoid taking such actions to increase signal quality if the battery charge of the mobile device is determined to be at a low level. Other techniques for improving the quality of the transmitted and received signals during high priority calls consistent with this disclosure are possible in various embodiments.

Figure 4:
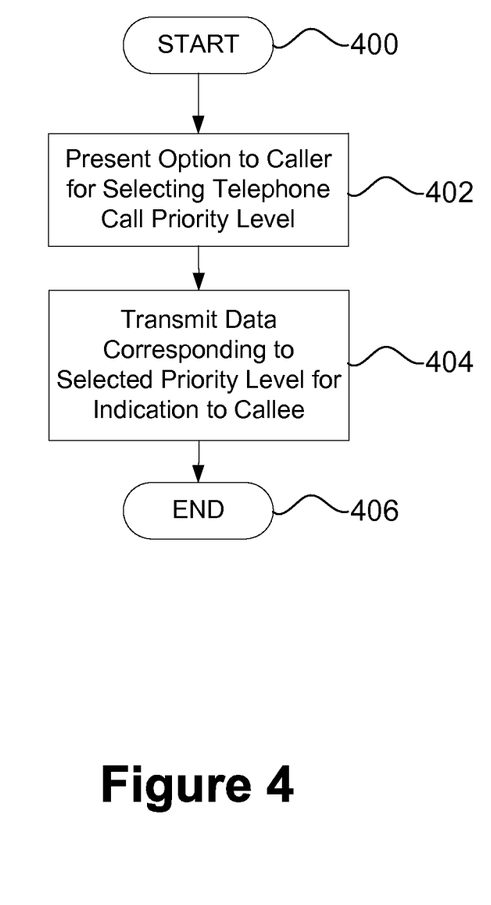
FIG. 4 is a flow chart of a process for use at a caller's device according to various embodiments.

FIG. 4 is a flow chart of a method for use at a caller's device according to various embodiments of the disclosure. The process starts at block 400.

At block 402, the caller is presented the option for selecting a priority level for the call. As an example, the caller may be presented with a popup window or a new window containing a priority selection area as previously described in this disclosure. Other techniques for allowing selection of a priority level, such as those previously described in this disclosure, may be used.

At block 404, data corresponding to the priority level selected by the caller is transmitted from the caller's mobile device, through the cellular network, and to the callee's mobile device. This data is preferably transmitted as part of or concurrently with the messaging used to initiate the call, such as call setup messaging. This data may be transmitted by the caller's mobile device to the callee's mobile device so that the callee's mobile device can indicate to the callee the priority level selected by the caller.

The process ends at block 406.

Figure 5:
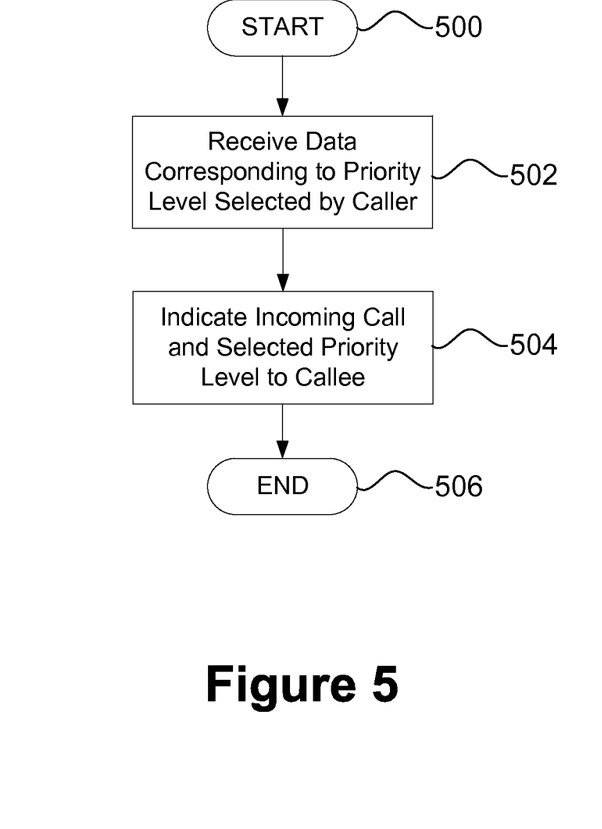
FIG. 5 is a flow chart of a process for use at a callee's device according to various embodiments.

FIG. 5 is a flow chart of a method for use at a callee's device according to various embodiments of the disclosure. The process starts at block 500.

At block 502, data corresponding to a priority level selected by a caller is received at a callee's mobile device. This data may be received as having been transmitted by the caller's mobile device, through the cellular network, and to the callee's mobile device. This data may be received as part of or concurrently with the messaging used to initiate a call with which the priority level is associated, such as call setup messaging.

At block 504, the callee's mobile device indicates to the callee that an incoming call has been received and that it is of the selected priority level. As an example, the callee's mobile device may display "Caller calling . . . HIGH PRIORITY!!" on a screen of the mobile device. Any of the techniques described previously in this disclosure for indicating the priority level of an incoming call may be used.

The process ends at block 506.

Figure 6:
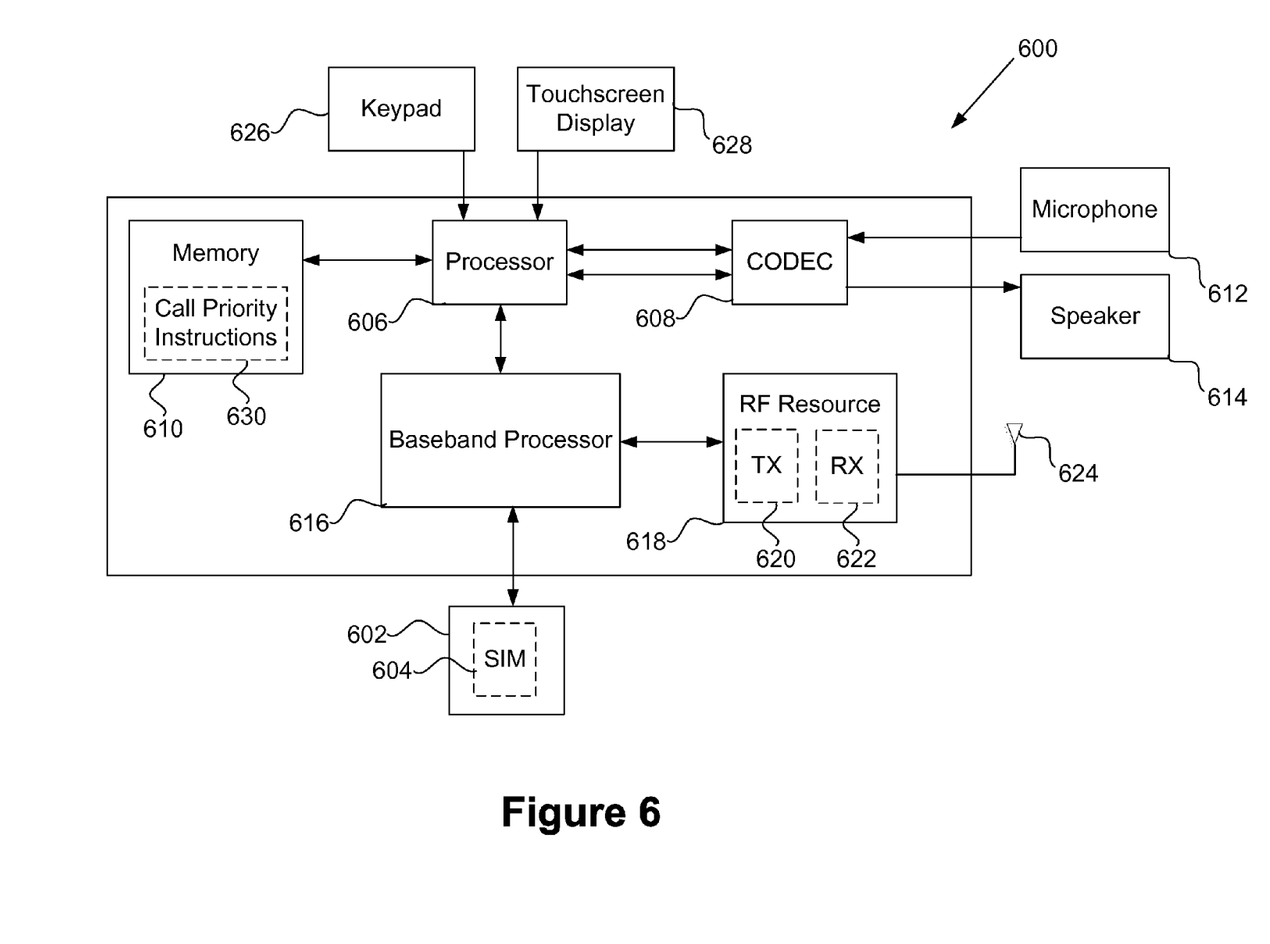
FIG. 6 is a functional block diagram of a mobile device according to various embodiments.

FIG. 6 is a functional block diagram of a mobile device 600 according to various embodiments of the disclosure. In some embodiments, mobile device 600 may be used as a caller mobile device as described previously herein. In some embodiments, mobile device 600 may be used as a callee mobile device as described previously herein.

Mobile device 600 may include an identity module interface 602. Identity module interface 602 may receive an identity module 604 associated with a subscription for a user of the mobile device 600. In some embodiments, identity module interface 602 may be a SIM interface and identity module 604 may be a SIM card.

Mobile device 600 may include at least one processor 606. In some embodiments, processor 606 may be provided as a general purpose processor. Processor 606 may include any suitable data processing device, such as a general purpose processor (e.g., a microprocessor). In the alternative, processor 606 may be any suitable electronic processor, controller, microcontroller, or state machine. Processor 606 may also be implemented as a combination of computing devices, e.g., a combination of a DSP and a microprocessor, a plurality of microprocessors, at least one microprocessor in conjunction with a DSP core, or any other such configuration.

Mobile device 600 may include a coder/decoder (CODEC) 608 coupled to processor 606. CODEC 608 may in turn be coupled to one or more user interface devices. The user interface device may include a display and a user input device. In various embodiments, the display may include any suitable device that provides a human-perceptible visible signal, audible signal, tactile signal, or any combination thereof. The display may include, but is not limited to, a touchscreen, LCD, LED, CRT, plasma, other suitable display screen, audio speaker 614, other audio generating device, combinations of the preceding, and the like. In various embodiments, the user input device may include any suitable device that receives input from the user. The user input device may include, but is not limited to, one or more manual operators (such as, but not limited to a switch, button, touchscreen, knob, slider, or the like), microphone 612, camera, image sensor, combinations of the preceding, and the like.

Mobile device 600 may include at least one memory 610 coupled to processor 606. Memory 610 may be a non-transitory processor-readable storage medium that stores processor-executable instructions. This medium may include, but is not limited to, random access memory ("RAM"), read only memory ("ROM"), floppy disks, hard disks, dongles, USB connected memory devices, combinations of the preceding, or the like. Memory 610 may store an operating system ("OS") as well as user application software and executable instructions.

Mobile device 600 may include at least one baseband processor 616 coupled to processor 606. Baseband processor 616 may be a baseband modem processor. Each identity module in mobile device 600 (e.g., identity module 604) may be associated with baseband-RF resources. The RF resources may include at least one baseband-RF resource chain. The baseband-RF resource chain may include baseband processor 616, which may perform baseband/modem functions for communications on identity module 604. The baseband-RF resource chain may also include one or more amplifiers and radios, such as RF resource 618. RF resource 618 may be a transceiver that performs transmit/receive functions for the mobile device 600. RF resource 618 may include transmitter 620 and receiver 622. RF resource 618 may include separate transmit and receive circuitry, or it may include a transceiver that combines transmitter and receiver circuitry. RF resource 618 may be coupled to a wireless antenna 624 for transmitting and receiving wireless signals across a wireless medium. RF resource 618 may further be coupled to baseband processor 616.

In some embodiments, processor 606, memory 610, baseband processor 616, and RF resource 618 may be included in mobile device 600 as a system-on-chip. In some embodiments, identity module 604 and identity module interface 602 may be external to the system-on-chip. Further, various input and output devices may be coupled to components on the system-on-chip, such as interfaces or controllers. Example user input components suitable for use in the mobile device 600 may include, but are not limited to, a keypad 626, touchscreen display 628, and microphone 612.

In some embodiments, keypad 626, touchscreen display 628, microphone 612, or a combination thereof may receive a request to initiate an outgoing call. For example, touchscreen display 628 may receive a selection of a contact from a contact list or receive a telephone number. As another example, the request to initiate the outgoing call may be in the form of a voice command received via microphone 612. Interfaces may be provided between the various software modules and functions in the mobile device 600 to enable communication between them, as is known in the art.

In some embodiments (not shown), mobile device 600 may include, among other things, additional identity modules (e.g., additional SIM cards), additional identity module interfaces (e.g., additional SIM interfaces), a plurality of RF resources, and additional antennae for connecting to additional mobile networks.

In particular embodiments, memory 610 may be configured to store processor-executable instructions for performing various features related to the present disclosure, such as call priority instructions 630.

In particular embodiments, call priority instructions 630 may be effective to cause mobile device 600 to present to a user of the mobile device 600 an option for selecting a priority level for a call. For example, upon receiving from touchscreen display 628 a request to initiate a call to a callee, call priority instructions 630 may cause touchscreen device 628 to display a popup message requesting the selection of a priority level for the call.

In particular embodiments, call priority instructions 630 may be effective to cause mobile device 600 to transmit data corresponding to a selected call priority level through a cellular network to a callee's mobile device. For example, upon receiving from touchscreen display 628 an indication of a call priority level selected by the user (e.g., the caller) of the mobile device 600, call priority instructions 630 may cause RF resource 618 to transmit data corresponding to the selected call priority level over a cellular network using antenna 624.

In particular embodiments, call priority instructions 630 may be effective to cause mobile device 600 to indicate to a user of mobile device 600 a call priority level associated with an incoming call. For example, upon receiving data corresponding to a call priority using RF resource 618, call priority instructions 630 may cause touchscreen display 628 and speaker 614 to present information, e.g., visual text and a special tone, respectively, to the user (e.g., the callee) of the mobile device 600 that indicates the priority level selected by the caller.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A method of indicating a priority level for a call from a caller to a callee on an electronic communication network, the method comprising:
   receiving, at a callee's mobile device from a caller's mobile device, data corresponding to the priority level, the data corresponding to the priority level representing the priority level set by the caller's mobile device at the time of initiation of the call by the caller's mobile device;
   providing an indication on the callee's mobile device of the priority level at a time that the call is indicated by the callee's mobile device as incoming; and
   performing on the callee's mobile device one or more special behaviors corresponding to the priority level when the callee's mobile device answers the call,
   wherein the one or more special behaviors comprise changing one or more functions of applications executing on the callee's mobile device for the duration of the call based on the priority level.

2. The method of claim 1, wherein providing an indication of the priority level comprises at least one of the following: changing the callee's mobile device from a silent mode to a non-silent mode; displaying text that corresponds to the priority level on a screen of the callee's mobile device; displaying a color that corresponds to the priority level on the screen of the callee's mobile device; or emitting an audible tone that corresponds to the priority level from the callee's mobile device.

3. The method of claim 1, wherein providing an indication of the priority level comprises automatically answering the call.

4. The method of claim 1, further comprising:
   validating whether the caller is permitted to make the call to the callee using the priority level.

5. The method of claim 4, wherein validating comprises comparing on the callee's mobile device a phone number associated with the call to telephone numbers corresponding to contacts stored in the callee's mobile device.

6. The method of claim 5, wherein validating comprises comparing on the callee's mobile device a number associated with the call to telephone numbers corresponding to contacts indicated as favorites in the callee's mobile device.

7. The method of claim 1, wherein the one or more special behaviors comprise disabling indicators from the applications executing on the callee's mobile device for the duration of the call.

8. The method of claim 7, wherein the disabling of indicators from applications executing on the callee's mobile device comprises preventing a call waiting indicator for another incoming call at the callee's mobile device, wherein a priority level associated with the other incoming call is lower than the priority level for the call.

9. The method of claim 1, wherein the one or more special behaviors comprise terminating one or more applications executing on the callee's mobile device in order to reduce battery consumption.

10. The method of claim 1, wherein the one or more special behaviors further comprise increasing a transmit power of the callee's mobile device to a base station.

11. A mobile device for indicating a priority level of a call from a user of a second mobile device, the mobile device comprising:
    a memory; and
    at least one processor coupled to the memory and configured to:
       receive, from the second mobile device, data corresponding to the priority level, the data corresponding to the priority level representing the priority level set by the second mobile device at the time of initiation of the call by the second mobile device;
       provide an indication of the priority level at a time that the call is indicated on the mobile device as incoming; and
       perform one or more special behaviors corresponding to the priority level when the mobile device answers the call,
       wherein the one or more special behaviors comprise changing one or more functions of applications executing on the callee's mobile device for the duration of the call based on the priority level.

12. The mobile device of claim 11, wherein the at least one processor is further configured to provide an indication of the priority level by at least one of the following: changing the mobile device from a silent mode to a non-silent mode; displaying text that corresponds to the priority level on a screen of the mobile device; displaying a color that corresponds to the priority level on the screen of the mobile device; or emitting an audible tone that corresponds to the priority level from the mobile device.

13. The mobile device of claim 11, wherein the at least one processor is further configured to provide an indication of the priority level by automatically answering the call.

14. The mobile device of claim 11, wherein the at least one processor is further configured to validate whether the user of the second mobile device is permitted to make the call to the mobile device using the priority level.

15. The mobile device of claim 14, wherein the at least one processor is further configured to validate whether the user of the second mobile device is permitted to make the call to the mobile device using the priority level by comparing a phone number associated with the call to telephone numbers corresponding to contacts stored in the mobile device.

16. The mobile device of claim 15, wherein the at least one processor is further configured to validate whether the user of the second mobile device is permitted to make the call to the mobile device using the priority level by comparing a number associated with the call to telephone numbers corresponding to contacts indicated as favorites in the mobile device.

17. The mobile device of claim 11, wherein the one or more special behaviors comprise disabling indicators from the applications executing on the mobile device for the duration of the call.

18. The mobile device of claim 11, wherein the one or more special behaviors comprise terminating one or more applications executing on the mobile device in order to reduce battery consumption.

19. The mobile device of claim 11, wherein the one or more special behaviors further comprise increasing a transmit power of the mobile device to a base station.

20. A non-transitory computer-readable medium for indicating a priority level for a call from a caller to a callee on an electronic communication network, the non-transitory computer-readable medium, comprising code to:
receive, at a callee's mobile device from a caller's mobile device, data corresponding to the priority level, the data corresponding to the priority level representing the priority level set by the caller's mobile device at the time of initiation of the call by the caller's mobile device;
provide an indication on the callee's mobile device of the priority level at a time that the call is indicated by the callee's mobile device as incoming; and
perform one or more special behaviors corresponding to the priority level when the callee's mobile device answers the call,
wherein the one or more special behaviors comprise changing one or more functions of applications executing on the callee's mobile device for the duration of the call based on the priority level.

21. The non-transitory computer-readable medium of claim 20, wherein the one or more special behaviors further comprise increasing a transmit power of the callee's mobile device to a base station.

22. A method of indicating a priority for communication, the method comprising:
receiving, at a callee's mobile device from a caller's mobile device, data corresponding to a priority level for a call from the caller's mobile device to the callee's mobile device, the data corresponding to the priority level representing the priority level set at the caller's mobile device at the time of initiation of the call;
providing an indication on the callee's mobile device of the priority level at a time that the call is indicated at the callee's mobile device as incoming; and
disabling indicators from applications executing on the callee's mobile device for a duration of the call based on the priority level when the callee's mobile device answers the call.

23. A mobile device for indicating a priority level of a call from a user of a second mobile device, the mobile device comprising:
means for receiving, from the second mobile device, data corresponding to the priority level, the data corresponding to the priority level representing the priority level set by the second mobile device at the time of initiation of the call by the second mobile device;
means for providing an indication of the priority level at a time that the call is indicated on the mobile device as incoming; and
means for performing on the mobile device one or more special behaviors corresponding to the priority level when the mobile device answers the call,
wherein the one or more special behaviors comprise changing one or more functions of applications executing on the callee's mobile device for the duration of the call based on the priority level.

24. The mobile device of claim 23, wherein the one or more special behaviors further comprise increasing a transmit power of the mobile device to a base station.

* * * * *